United States Patent [19]

Yamamoto et al.

[11] Patent Number: 5,041,925
[45] Date of Patent: Aug. 20, 1991

[54] TAPE REPRODUCING APPARATUS WITH RECORDED MADE DETECTION BY COMPARISON OF TRACKING ERROR SIGNAL

[75] Inventors: Yukio Yamamoto; Nobutoshi Takayama, both of Kanagawa, Japan

[73] Assignee: Canon Kabushiki Kaisha, Tokyo, Japan

[21] Appl. No.: 547,522

[22] Filed: Jul. 2, 1990

Related U.S. Application Data

[63] Continuation of Ser. No. 307,148, Feb. 3, 1989, abandoned, which is a continuation of Ser. No. 905,578, Sep. 9, 1986, abandoned.

[30] Foreign Application Priority Data

Sep. 14, 1985 [JP] Japan .................. 60-203996

[51] Int. Cl.$^5$ ............................................. G11B 15/46
[52] U.S. Cl. .............................. 360/73.07; 360/73.05; 360/10.1
[58] Field of Search ...................... 360/73.05, 73.07

[56] References Cited

U.S. PATENT DOCUMENTS

| | | | |
|---|---|---|---|
| 4,594,618 | 6/1986 | Kozuki et al. | 360/73.05 |
| 4,607,298 | 8/1986 | Yamashita | 366/70 |
| 4,618,899 | 10/1986 | Doutsubo | 360/73.07 |
| 4,679,099 | 7/1987 | Edakubo | 360/10.2 |
| 4,680,648 | 7/1987 | Takayama | 360/10.2 |
| 4,682,247 | 7/1987 | Doutsubo | 360/10.3 |
| 4,716,473 | 12/1987 | Kondo | 360/10.3 |
| 4,757,394 | 7/1988 | Okamoto et al. | 360/70 |

FOREIGN PATENT DOCUMENTS 61-16056 1/1986 Japan .................. 360/73.07
61-16057 1/1986 Japan .................. 360/73.07

Primary Examiner—Vincent P. Canney
Assistant Examiner—David L. Robertson
Attorney, Agent, or Firm—Robin, Blecker, Daley & Driscoll

[57] ABSTRACT

A reproducing apparatus is arranged to have a plurality of reproducing modes corresponding to a plurality of recording modes in which recording is performed on a tape-shaped recording medium by allowing the medium to longitudinally travel at one of different speeds and to reproduce information signals recorded in recording tracks which are formed on the tape-shaped recording medium in the direction of crossing the longitudinal direction of the medium by recording the signals at least in one of the recording modes. The apparatus comprises reproducing means for reproducing the information signals by tracing the recording tracks; reproducing mode error signal generating means for generating on the basis of the information signal reproduced by the reproducing means a reproducing mode error signal relative to whether reproduction is being performed in one of the reproducing modes which corresponds to the recording mode employed in recording the information signal on the tape-shaped recording medium; reproducing mode selecting means for selecting one of the plurality of reproducing modes according to the reproducing mode error signal generated by the reproducing mode error signal generating means; and generation characteristic control means for controlling the reproducing mode error signal generating characteristic of the reproducing mode error signal generating means according to the kind of the reproducing mode selected by the reproducing mode selecting means.

14 Claims, 3 Drawing Sheets

TAPE REPRODUCING APPARATUS WITH RECORDED MADE DETECTION BY COMPARISON OF TRACKING ERROR SIGNAL

This application is a continuation of application Ser. No. 307,148, filed Feb. 3, 1989, now abandoned, which is a continuation of application Ser. No. 905,578, filed Sept. 9, 1986, and now abandoned.

BACKGROUND OF THE INVENTION

1. Field of the Invention

This invention relates to a reproducing apparatus having a plurality of reproducing modes and arranged to discriminate a recording mode on the basis of information reproduced.

2. Description of the Related Art

The known apparatuses of the above-stated kind include magnetic recording/reproducing apparatuses arranged to record with rotary heads one field portion of a video signal in each of recording tracks by obliquely forming these tracks one by one on a magnetic tape and to reproduce the recorded signal with the rotary heads (hereinafter referred to as VTR). The known VTR's include a type wherein the pitch at which the recording tracks are formed (herein after the track pitch will be called TP for short) is determined by selecting one of different speeds at which the tape is moved for recording; and, in carrying out reproduction, the TP is automatically discriminated and reproduction is performed by allowing the tape to travel at the same speed as the speed employed in recording. The VTR of this type is taken up by way of example in the following description of the present specification.

Heretofore, in the VTR of this type, a tracking control signal which is in relation to the recording tracks formed during recording or to the recorded video signals is recorded also during recording along the edge part of the tape in the tape moving direction. During reproduction, the TP, i.e. the tape speed employed in recording, is detected through the recurrent period of the control signal detected by reproduction and the tape moving speed is controlled accordingly for reproduction. However, as a result of a recent tendency to reduce the size of the VTR and to record signals with increased density, it has been proposed to record tracking control pilot signals by superimposing them on the video signals instead of recording the tracking control signal in the above-stated manner. In the VTR of that type, a plurality of different pilot signals are generally superimposed on the recording tracks of the video signals one by one. Then, during reproduction, tracking control is carried out according to a tracking error signal obtained by detecting a difference in level between the pilot signals reproduced from two tracks neighboring on both sides of a recording track being mainly traced for reproduction.

Further, the tracking error signal which is thus obtained is also used for discriminating the TP. In other words, when the tape is allowed to travel for reproduction at a speed different from a travelling speed employed in recording, the tracking error signal is generated at a much greater magnitude than in the case of reproduction at the same tape speed as the speed employed in recording. Therefore, in the event of such a great tracking error signal, the reproducing operation has been carried out by shifting the tape travel speed to an apposite speed. However, in case that a recording operation is performed with the same magnetic head of a VTR, for example, at two different tape travel speeds, one being a fast speed (hereinafter referred to as the SP mode) and the other a slow speed (hereinafter referred to as the LP mode), there obtains a relation of TPs>Hw>TPl, wherein TPs and TPl represent the TP's resulting from recording at these different tape speeds while Hw represents the width of the head. Then, assuming that the recording operation is performed in the manner called overlapping writing at least in the LP mode and that the recording tracks are formed at an effective width TWs in the SP mode and at another effective width TWl in the LP mode, there obtains a relation of TWs>TWl. Therefore, in the event that the information signals recorded in these two modes SP and LP are reproduced in another mode which differs from either of the modes, a maximum output value of the tracking error signal obtainable from each recording track is greater in the case of the SP mode than in the case of the LP mode.

Such being the case, in switching one tape travel speed over to another by checking the tracking error signal for finding out the tape speed employed in recording, the speed switch-over action has been apt to be erroneously performed without adequate consideration of the difference in output value of the tracking error signal due to the above-stated difference in track width. This problem has often hindered apposite reproduction.

SUMMARY OF THE INVENTION

It is a general object of this invention to solve the above-stated problem.

It is a more specific object of this invention to provide a reproducing apparatus which is capable of carrying out reproduction with a high degree of reliability in an apposite reproducing mode.

Under this object, a reproducing apparatus arranged according to this invention as an embodiment thereof to have a plurality of reproducing modes corresponding to a plurality of recording modes in which recording is performed on a tape-shaped recording medium by allowing the medium to longitudinally travel at one of different speeds and to reproduce information signals recorded in recording tracks which are formed on the tape-shaped recording medium in the direction of crossing the longitudinal direction of the medium by recording the signals at least in one of the recording modes comprises: reproducing means for reproducing the information signals by tracing the recording tracks; reproducing mode error signal generating means for generating on the basis of the information signal reproduced by the reproducing means a reproducing mode error signal relative to whether reproduction is being performed in one of the reproducing modes which corresponds to the recording mode employed in recording the information signal on the tape-shaped recording medium; reproducing mode selecting means for selecting one of the plurality of reproducing modes according to the reproducing mode error signal generated by the reproducing mode error signal generating means; and generation characteristic control means for controlling the reproducing mode error signal generating characteristic of the reproducing mode error signal generating means according to the kind of the reproducing mode selected by the reproducing mode selecting means.

It is another object of this invention to provide a reproducing apparatus which is capable of accurately discriminating a reproducing mode with simple structural arrangement.

Under that object, a reproducing apparatus arranged according to this invention as another embodiment thereof to have a plurality of reproducing modes corresponding to a plurality of recording modes in which recording is performed on a tape-shaped magnetic recording medium by allowing the medium to longitudinally travel at one of different speeds and to reproduce information signals which include pilot signals and are recorded in recording tracks formed on the tape-shaped magnetic recording medium in the direction of crossing the longitudinal direction of the medium by recording the signals at least in one of the recording modes comprises: a magnetic head device for reproducing the information signals including the pilot signals by tracing the recording tracks; tracking error signal generating means for generating a tracking error signal by using the pilot signals reproduced by the magnetic head device; reproducing mode error signal generating means for generating, according to the level of the tracking error signal generated by the tracking error signal generating means, a reproducing mode error signal relative to whether reproduction is being performed in one of the reproducing modes which corresponds to the recording mode employed in recording the information signal on the tape-shaped magnetic recording medium; reproducing mode switching means for switching one reproducing mode over to another according to the length of time during which the reproducing mode error signal is generated by the reproducing mode error generating means; and tracking error signal level control means for controlling, according to the kind of the reproducing mode selected by the reproducing mode switching means, the level of the tracking error signal generated by the tracking error signal generating means.

Further objects and features of this invention will become apparent from the following detailed description of embodiments thereof taken in connection with the accompanying drawings.

DETAILED DESCRIPTION OF THE PREFERRED EMBODIMENTS

Figure 1:
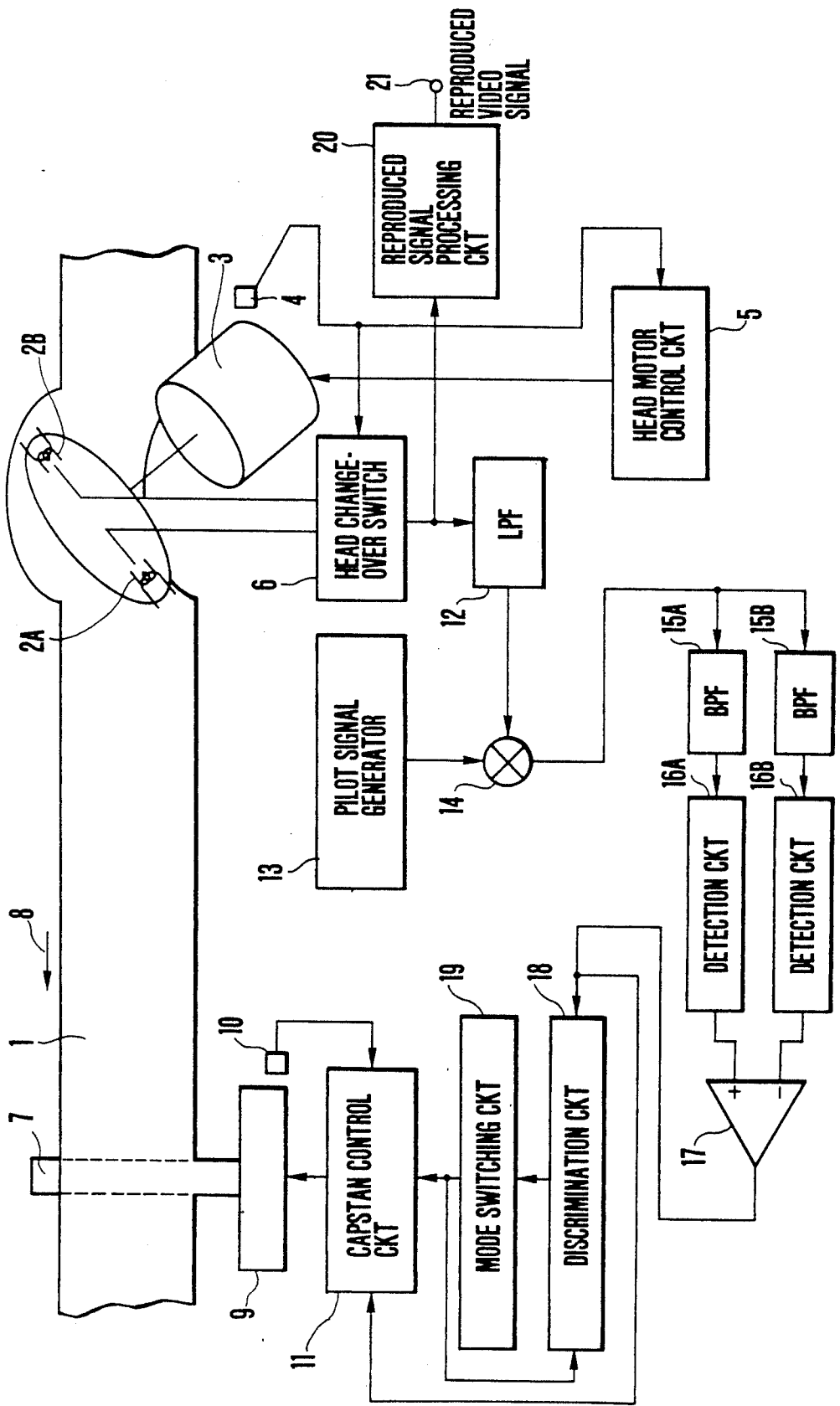
FIG. 1 is a diagram showing in outline the arrangement of the reproducing system of a VTR embodying this invention as an embodiment thereof.

The reproducing system of a VTR embodying this invention by way of example is arranged as shown in outline in FIG. 1. The illustration includes a magnetic tape 1 and magnetic heads 2A and 2B. The heads 2A and 2B are of the same head width and differ from each other in the azimuth angle of their gaps. These heads are arranged to reproduce signals recorded by allowing the tape 1 to travel at a fast speed to form a recording track pattern at a wide TP (hereinafter referred to as the SP or short time mode) and signals recorded by allowing the tape to travel at a slow speed to form a recording track pattern at a narrow TP (hereinafter referred to as the LP or long time mode). A head motor 3 is arranged to rotate the magnetic heads 2A and 2B. A head motor rotation detector 4 is arranged to produce pulses relative to the rotation of the head motor 3. A head motor control circuit 5 is arranged to cause the head motor 3 to rotate at a constant speed and at a given phase according to the pulses obtained from the rotation detector 4. A head changeover switch 6 is arranged to make reproduced signals produced from the magnetic heads 2A and 2B into a continuous signal. The position of the switch 6 is shifted from one position to another according to the pulses produced from the rotation detector 4. A capstan 7 which is provided for moving the tape 1 is arranged to move the tape in the direction of arrow 8 in cooperation with a pinch roller which is not shown. The capstan 7 is provided with a capstan fly-wheel 9. A fly-wheel rotation detector 10 is arranged to detect the rotation of the fly-wheel 9 and to produce pulses corresponding to the detected rotation (hereinafter referred to as the PG signal). A capstan control circuit 11 is arranged to control and drive the capstan 7 in such a way as to have the magnetic heads 2A and 2B accurately trace the recording tracks. A low-pass filter (hereinafter referred to as LPF) 12 is arranged to separate the pilot signals superimposed on the low frequency zone side within the reproduced signal obtained via the head change-over switch 6. A pilot signal generator 13 is arranged to generate pilot signals of the same kind as the pilot signals obtained from the reproduced signal. A multiplier 14 is arranged to multiply the pilot signals separated from the reproduced signal by the pilot signals generated by the pilot signal generator 13. Band-pass filters 15A and 15B (hereinafter referred to as BPF's) are arranged to separate difference frequencies of two kinds produced from the multiplier 14. Detection circuits 16A and 16B are arranged to detect the outputs of the BPF's 15A and 15B respectively. A differential amplifier 17 is arranged to detect a level difference between the signals, which have undergone the detection processes of the detection circuits 16A and 16B and to generate a tracking error signal. A discrimination circuit 18 is arranged to detect the level of the tracking error signal generated and to produce a discrimination signal according to the state of the tracking error signal. A mode switching circuit 19 is arranged to produce a tape travel mode switching signal according to the discrimination signal supplied thereto. A reproduced signal processing circuit 20 is arranged to obtain a video signal in its original signal form from the reproduced signal. An output terminal 21 is arranged to produce the reproduced video signal.

Figure 2:
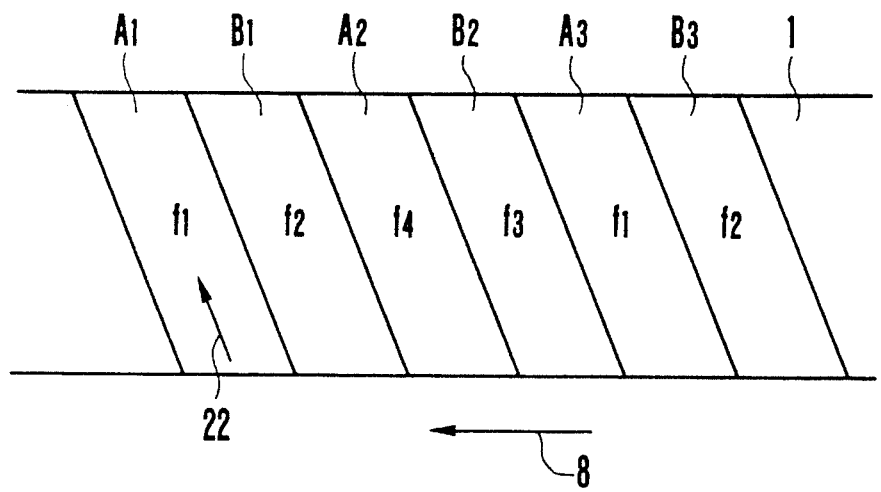
FIG. 2 shows a track pattern formed on a magnetic tape when pilot signals of different kinds for tracking control are recorded in the SP mode by superimposing them on video signals.

FIG. 2 shows a track pattern formed on the magnetic tape with the pilot signals of a plurality of kinds for tracking control are superimposed on the video signal when the latter is recorded in the short-time or SP mode. Recording tracks A1, A2 and A3 are respectively formed by means of a head of the same azimuth angle as the magnetic head 2A. Recording tracks B1, B2 and B3 are respectively formed by a head of the same azimuth angle as that of the magnetic head 2B. Reference symbols f1, f2, f4 and f3 denote the frequencies of pilot signals superimposed on the video signal in these recording tracks, one pilot signal being thus recorded in each of the tracks. An arrow 22 indicates the direction in which the recording tracks are to be traced by the magnetic heads 2A and 2B.

During reproduction, the records in these tracks are reproduced by the magnetic heads 2A and 2B one after another in the order of tracks A1, B1, A2, B2, A3, B3, - - - . Then, the pilot signals having the different frequencies f1, f2, f4, f3, f1, f2,—(hereinafter these pilot signals of different frequencies will be called as pilot signals f1, f2, f4 and f3 for the sake of simplification) are also reproduced one after another according as the video signal is reproduced. The frequencies of these pilot signals are much lower than the frequency band of the video signal recorded on the magnetic tape and thus remain unaffected by the influence of the azimuth angle. In other words, there takes place no azimuth loss. Therefore, if the magnetic heads 2A and 2B are arranged to have a head width a little wider than the TP, pilot signals of two neighboring tracks are also reproduced in addition to the pilot signal of the track mainly undergoing the process of reproduction. The frequency values of the pilot signals are arranged such that a frequency difference between any two of them is either $\Delta fa$ or $\Delta fb$ as shown below:

$$|f1 - f2| = \Delta fa \quad |f2 - f3| = \Delta fb$$
$$|f3 - f4| = \Delta fa \quad |f4 - f1| = \Delta fb$$

The LPF 12 extracts only the pilot signals of four different low frequencies from the signal reproduced by the magnetic heads 2A and 2B. Then, these reproduced pilot signals of four different kinds (or frequencies) are multiplied at the multiplier 14 by similar pilot signals which are generated by the pilot signal generator 13. The difference frequencies $\Delta fa$ and $\Delta fb$ are thus obtained through this process.

The BPF's 15A and 15B and the detection circuits 16A and 16B are provided for these difference frequencies $\Delta fa$ and $\Delta fb$. The magnetic heads 2A and 2B are regarded as accurately tracing tracks, that is, as in an on-track state when the level difference between these two difference frequencies becomes zero. For this purpose, the differential amplifier 17 is arranged to detect the level difference between the two difference frequencies and to generate the tracking error signal.

The tracking error signal which is thus obtained is supplied to the capstan control circuit 11. Then, the travel of the tape 1 is controlled through the capstan 7, so that tracking can be always adequately accomplished.

Figure 3:
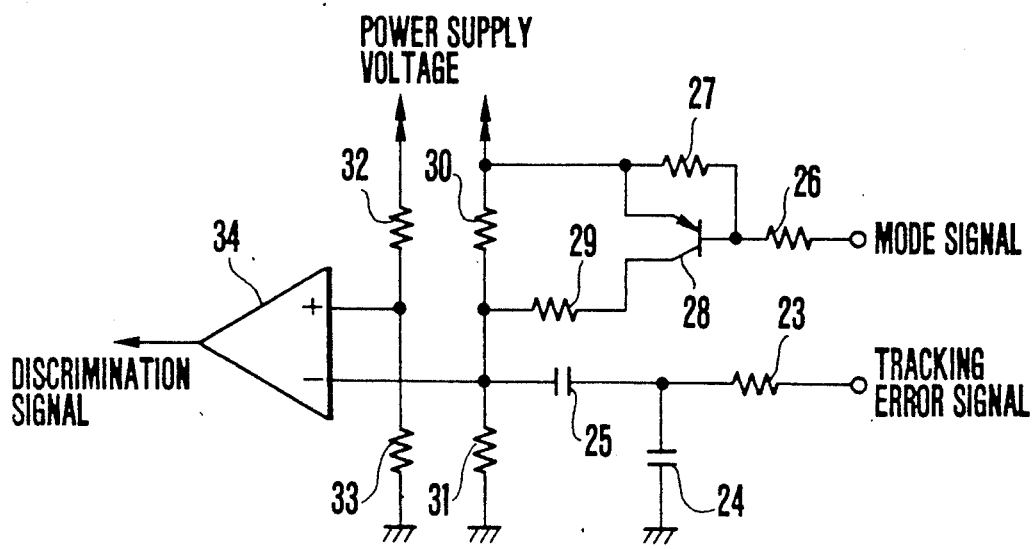
FIG. 3 is a circuit diagram showing by way of example the details of a discrimination circuit included in FIG. 1.

The operation of the embodiment in the long-time or LP mode is performed in the same manner as in the case of the SP mode with the exception of the difference in the TP and TW (effective track width) and inclination of tracks of the recording pattern. The details of the discrimination circuit 18 of FIG. 1 is as follows:

FIG. 3 shows an example of the arrangement of the discrimination circuit 18. Referring to FIG. 3, the tracking error signal which is generated in the manner as described above has its DC voltage level changed by the action of a transistor 28.

In other words, the incoming tracking error signal is rectified by a resistor 23, capacitors 24 and 25. When reproduction is performed in the SP mode, the level of a mode signal which will be described later herein becomes low (hereinafter referred to as L). Then, the transistor 28 turns on to cause the tracking error signal to be raised by resistors 30, 29 and 31 to an extent as much as a DC voltage level divided from a power supply voltage. Further, in the event of reproduction in the LP mode, the level of the mode signal becomes high (hereinafter referred to as H). The transistor 28 then turns off to cause the tracking error signal to be raised by the resistors 30 and 31 to an extent as much as a DC voltage level divided from the power supply voltage. The values of the resistors 29, 30 and 31 are set at such values that the above-stated DC voltage level is higher in the SP reproduction mode than in the LP reproduction mode. The reason for this arrangement is as follows:

The maximum level at which the tracking error signal is obtainable during reproduction in a reproduction mode differing from the recording mode varies with the track width TWs or TWl obtained in the SP or LP recording mode, with recording accomplished in the overlapping writing at least in the LP mode, as mentioned in the foregoing. The maximum level of the error signal obtainable by reproducing in the SP mode the signals which are recorded on the tape in the LP mode is lower than the level obtainable by reproducing in the LP mode the signals recorded in the SP mode on the tape. The SP reproduction mode is to be shifted only in the case of a record recorded in the LP mode. The LP reproduction mode is to be shifted only for a record recorded in the SP mode. In view of this, the DC voltage level of the tracking error signal is arranged to be raised to a greater degree in the case of the SP mode than in the case of the LP mode.

The tracking error signal which has its level raised as much as the above-stated DC voltage level is supplied to a comparator 34. To the comparator 34 is also supplied a reference voltage which is obtained by dividing the power supply voltage by means of resistors 32 and 33. The comparator 34 compares the tracking error signal with the reference voltage. The tracking error signal is allowed to be produced as a discrimination signal only when the error signal is higher than the reference voltage. The circuit 18 is provided with protection resistors 26 and 27.

The discrimination signal which is generated in this manner at the discrimination circuit 18 is supplied to the mode switching circuit 19. The circuit 19 is arranged to monitor the incoming discrimination signal and to detect whether the discrimination signal is generated over a given period of time. If the signal is detected to exceed the given period, the circuit 19 produces a mode signal which causes the present reproduction mode to be switched over to the other mode.

Assuming that the mode signal is at an L level when reproduction is performed in the SP mode and at an H level in the case of the LP mode, if a record recorded in the SP mode on the tape is reproduced in the LP mode, for example, the discrimination signal is generated over the given period of time as tracking cannot be accomplished. In that event, the level of the mode signal is shifted from the H level to the L level. Further, in the case of reproduction in the SP mode of a record recorded on the tape in the LP mode, tracking likewise becomes impossible and the discrimination signal is also generated over the given period. In this case, the mode signal is shifted from the L level to the H level.

In response to the mode signal which is generated in the manner described, the capstan control circuit 11 controls the rotating speed of the capstan 7 while monitoring the rotation of the capstan fly-wheel 9 by means of the fly-wheel rotation detector 10.

The mode signal is supplied also to the discrimination circuit 18 to control thereby the ON and OFF states of the transistor 28 of FIG. 3.

Through the operation described above, the reproduction mode is switched from one mode over to the other by using the tracking error signal. The rotating speed of the capstan is controlled according to the change-over of the reproduction mode. It is an advantage of the embodiment that the arrangement to change the DC voltage level of the tracking error signal according to the reproduction mode effectively prevents an erroneous operation to automatically ensure adequate reproduction.

In the embodiment described, the DC voltage level of the tracking error signal is arranged to be changed in generating the discrimination signal. This arrangement may be replaced with a different arrangement in which the reference voltage is changed instead of changing the DC voltage level. In that instance, the reference level to be used at the comparator 34 is lowered for the SP reproduction mode and raised for the LP reproduction mode in a manner reverse to the arrangement of the embodiment described.

Figure 4:
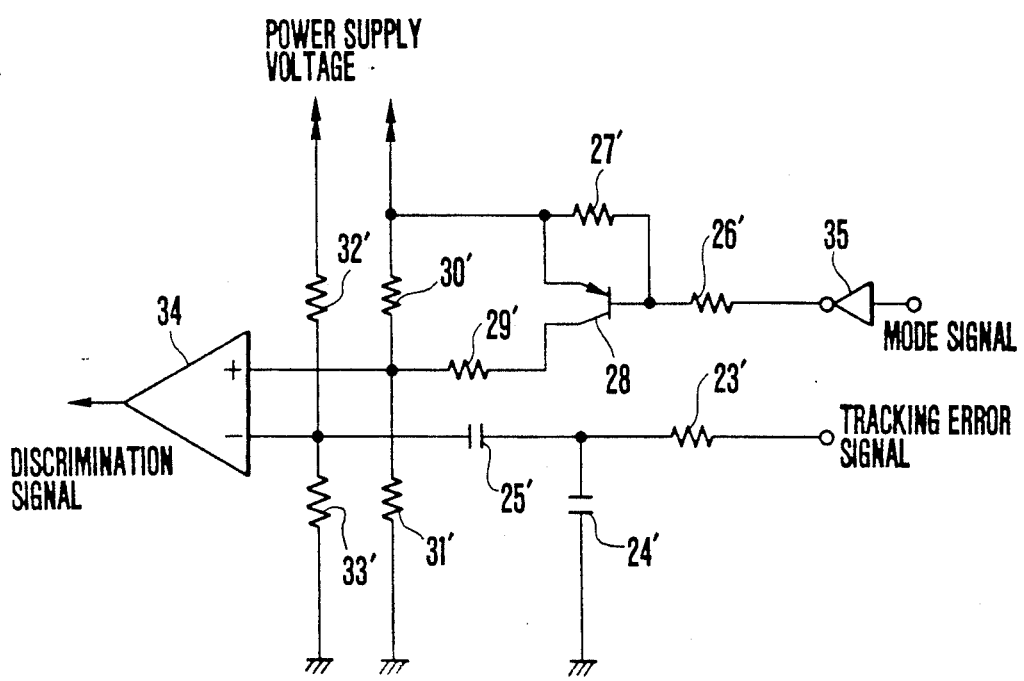
FIG. 4 is a diagram showing another example of the discrimination circuit.

FIG. 4 shows another example of arrangement of the discrimination circuit 18 of FIG. 1. In this case, the reference voltage is arranged to be changed as mentioned above. In FIG. 4, the parts which are identical with those shown in FIG. 3 are indicated by the same reference numerals and the details of them are omitted from the following description. The constants of the resistors and capacitors are suitably set according to the signal to be handled and a desired voltage value. Unlike in the case of FIG. 3, the reference level of the comparator 34 is lowered for the SP reproduction mode and is raised for the LP reproduction mode, i.e. when the mode signal is at an H level. Therefore, in this case, an inverter 35 is used to have the ON and OFF states of the transistor 28 controlled by a mode signal inverted by means of this inverter 35.

In accordance with this invention, as apparent from the foregoing description, a reproducing apparatus of the kind having a plurality of reproduction modes and arranged to discriminate the recording mode on the basis of reproduced information can be arranged to have a high degree of reliability and to be capable of accurately discriminating the recording mode despite of simple structural arrangement thereof.

What is claimed is:

1. A reproducing apparatus arranged to have a plurality of reproducing modes corresponding to a plurality of recording modes in which recording is performed on a tape-shaped recording medium by allowing said medium to longitudinally travel at one of different speeds and to reproduce information signals recorded in recording tracks which are formed on said medium in the direction of crossing the longitudinal direction of said medium by recording said signals at least in one of said recording modes, comprising:
    a) reproducing means for reproducing said information signals by tracing said recording tracks;
    b) tracking error signal generating means for generating a tracking error signal by using an information signal reproduced by said reproducing means
    c) reproducing mode indicating signal generating means for selecting one of said plurality of reproducing modes and generating a reproducing mode indicating signal corresponding to the selected reproducing mode; and
    d) discriminating means for discriminating whether or not he reproducing operation is effected by said reproducing means on the basis of the reproducing mode corresponding to the recording mode employed at the time of recording on said tape-shaped recording medium, by comparing said tracking error signal generated from said tracking error signal generating means with a reference signal, which is the reproducing mode indicating signal generated by said reproducing mode indicating signal generating means.

2. A reproducing apparatus arranged to have a plurality of reproducing modes corresponding to a plurality of recording modes in which recording is performed on a tape-shaped recording medium by allowing said medium to longitudinally travel at one of different speeds and to reproduce information signals recorded in recording tracks which are formed on said medium in the direction of crossing the longitudinal direction of said medium by recording said signals at least in one of said recording modes, comprising:
    a) reproducing means for reproducing said information signals by tracing said recording tracks;
    b) tracking error signal generating means for generating a tracking error signal by using an information signal reproduced by said reproducing means;
    c) reproducing mode indicating signal generating means arranged to select one of said plurality of reproducing modes and to generate a reproducing mode indicating signal corresponding to the selected reproducing mode;
    d) level control means for controlling a level of the tracking error signal generated by said tracking error signal generating means in accordance with the state of the reproducing mode indicating signal generated by said reproducing mode indicating signal generating means; and
    e) comparison means for comparing the tracking error signal level controlled by said level control means and a reference level, to generate a reproducing mode error signal relative to whether or not reproducing is being performed in one of the reproducing modes which corresponds to the recording mode employed in recording said information signal on said tape-shaped medium and to control said reproducing mode indicating signal generating means so that the reproducing mode indicating signal corresponding to the state of the reproducing mode error signal is generated by said reproducing mode indicating signal generating means.

3. A reproducing apparatus arranged to have a plurality of reproducing modes corresponding to a plurality of recording modes in which recording is performed on a tape-shaped recording medium by allowing said medium to longitudinally travel at one of different speeds and to reproduce image information signals which are recorded in recording tracks formed on said medium in the direction of the crossing the longitudinal direction of said medium by recording in at least one of said recording modes, said tape-shaped recording medium including one kind of pilot signal which is multiplexed on the image information signal and which is selected from pilot signals having a plurality of frequencies lower than that of the image information signal in such manner that the frequencies of respective adjacent recording tracks are different from each other, comprising:

a) reproducing means for reproducing the image information signal and the pilot signal recorded on said recording track, by simultaneously tracing the plurality of recording tracks;

b) tracking error signal generating means for generating a tracking error signal by using a plurality of said pilot signals reproduced by said reproducing means;

c) reproducing mode indicating signal generating means arranged to select one of said plurality of reproducing modes and to generate a reproducing mode indicating signal corresponding to the selected reproducing mode;

d) level control means for controlling a level of the tracking error signal generated by said tracking error signal generating means in accordance with the state of the reproducing mode indicating signal generated by said reproducing mode indicating signal generating means; and e) comparison means for comparing the tracking error signal level controlled by said level control means and a reference level, to generate a reproducing mode error signal relative to whether or not reproducing is being performed in one of the reproducing modes which corresponds to the recording mode employed in recording said information signal on said tape-shaped medium and to control said reproducing mode indicating signal generating means so that the reproducing mode indicating signal corresponding to the state of the reproducing mode error signal is generated by said reproducing mode indicating signal generating means.

4. A reproducing apparatus arranged to have a plurality of reproducing modes corresponding to a plurality of recording modes in which recording is performed on a tape-shaped magnetic recording medium by allowing said medium to longitudinally travel at one of different speeds and to reproduce information signals which include pilot signals and are recorded in recording tracks formed on said medium in the direction of crossing the longitudinal direction of said medium by recording in at least one of said recording modes, comprising:

a) a magnetic head device for reproducing said information signals including said pilot signals by tracking said recording tracks;

b) tracking error signal generating means for generating a tracking error signal by using the pilot signals reproduced by said magnetic head device;

c) reproducing mode error signal generating means for generating, according to the level of the tracking error signal, a reproducing mode error signal relative to whether reproduction is being performed in one of the reproducing modes which corresponds to the recording mode employed in recording said information signals on said tape-shaped magnetic recording medium;

d) reproducing mode selecting means for selecting a reproducing mode according to a state of generation of said reproducing mode error signal generated by said reproducing mode error signal generating means; and e) tracking error signal level control means arranged to control the level of the tracking error signal generated by said tracking error signal generating means, depending upon the kind of the reproducing mode selected by said reproducing mode selecting means, and supply the same to said reproducing mode error signal generating means.

5. An apparatus according to claim 4, wherein said magnetic head device includes a magnetic head the width of which in the direction perpendicular to the recording track tracing direction is arranged to be wider than the narrowest track width in the direction perpendicular to the longitudinal direction of said recording tracks.

6. An apparatus according to claim 5, wherein said magnetic head device further includes a plurality of magnetic heads having their widths equal to each other in the direction perpendicular to the recording track tracing direction.

7. An apparatus according to claim 4, wherein said reproducing modes include a first reproducing mode in which said tape-shaped magnetic recording medium is allowed to travel at a first travelling speed and a second reproducing mode in which said medium is allowed to travel at a second travelling speed, said second travelling speed being faster than said first travelling speed.

8. An apparatus according to claim 7, wherein said tracking error signal level control means is arranged to make the level of said tracking error signal higher in said second reproducing mode than in the case of said first reproducing mode.

9. An apparatus according to claim 7, wherein said tracking error signal level control means is arranged to include a DC level control circuit which changes the DC level of said tracking error signal and to make said DC level of the tracking error signal higher in said second reproducing mode than in said first reproducing mode.

10. A reproducing apparatus arranged to have a plurality of reproducing modes corresponding to a plurality of recording modes in which recording is performed on a tape-shaped magnetic recording medium by allowing said medium to longitudinally travel at one of different speeds and to reproduce information signals which include pilot signals and are recorded in recording tracks formed on said medium in the direction of crossing the longitudinal direction of said medium by recording said signals in at least one of said recording modes, comprising:

a) a magnetic head device for reproducing said information signals including said pilot signals by tracking said recording tracks;

b) tracking error signal generating means for generating a tracking error signal by using the pilot signals reproduced by said magnetic head device;

c) reference level signal generating means for generating a reference level signal;

d) reproducing mode error signal generating means arranged to compare the tracking error signal generated by said tracking error signal generating means with said reference level signal and to generate, according to the result of said comparison, a reproducing mode error signal relative to whether reproduction is being performed in one of reproducing modes which corresponds to the recording mode used in recording said information signals on said tape-shaped magnetic recording medium;

e) reproducing mode selecting means for selecting a reproducing mode according to a state of generation of said reproducing mode error signal generated by said reproducing mode error signal generating means; and f) tracking error signal level control means arranged to control the level of the tracking error signal generated by said tracking error signal generating means, depending upon the kind of the reproducing mode selected by said reproducing mode selecting means, and supply the same to said reproducing mode error signal generating means.

11. An apparatus according to claim 10, wherein said reproducing modes include a first reproducing mode in which said tape-shaped magnetic recording medium is caused to travel at a first travelling speed and a second reproducing mode in which said medium is caused to travel at a second travelling speed, said second travelling speed being faster than said first travelling speed.

12. An apparatus according to claim 11, wherein said magnetic head device includes a magnetic head the width of which in the direction perpendicular to said recording track tracing direction is arranged to be wider than the width of the recording tracks in the direction perpendicular to the longitudinal direction of said tracks formed in the recording mode corresponding to said first reproducing mode.

13. An apparatus according to claim 12, wherein said magnetic head device further includes a plurality of magnetic heads having their widths arranged to be equal to each other in the direction perpendicular to the recording track tracing direction thereof.

14. An apparatus according to claim 11, wherein said reference level signal level control means is arranged to cause the level of the reference level signal generated from said reference level signal generating means to be lower in the case of said second reproducing mode than in said first reproducing mode.

* * * * *